United States Patent Office 3,293,144
Patented Dec. 20, 1966

3,293,144

MALTING PROCESS USING ALCOHOLS

Eric Kneen, Elm Grove, John G. Fleckenstein, Brookfield, and Lawrence D. Beckord, Elm Grove, Wis., assignors to Kurth Malting Company, Milwaukee, Wis., a corporation of Wisconsin No Drawing. Filed May 13, 1963, Ser. No. 280,119
14 Claims. (Cl. 195—70)

This application is concerned with the production of malt. More particularly, this invention is concerned with a novel process of producing malt in high yields by economical means.

Many cereal grains are malted for use in the brewing and distilling industries, as well as for use in foodstuffs. Among the grains that are so malted are barley, wheat, rice, rye, oats, and various other cereal grains such as millet and sorghum. The most important of these, of course, is malted barley.

The production of malt from cereal grains generally comprises four steps. In the first step the harvested grain is stored so as to build up its germinating capacity. This usually requires from thirty to sixty days from the harvest time.

In the second step the cereal grain is steeped in water. The steeping generally requires one to three days in water at about 50 to 65° F. to achieve penetration of the water into the cereal grain. After the moisture content has reached the desired limit, and before the kernels begin to germinate significantly, steeping is considered complete.

In the third step, the steeped cereal grain is germinated. Careful control of temperature, moisture and oxygen supply is maintained to achieve the proper germination. Normally the growth starts slowly at the embryo or germ end of the kernels the first day with growth being accelerated the second day. Germinating barley kernels begin to "chit" at the base of the kernel by showing a white tip. Rootlets then grow outwardly away from the tip. The acrospire also starts from the base of the kernel and grows under the hull towards the top end of the kernel. During germination, heat and carbon dioxide are given off and are removed by aeration. From the experience of many years of malting, it has been determined that the germinating grain should be maintained at a temperature of about 60 to 70° F. By the time the acrospire has grown from about three quarters to the full length of the kernel, it is generally considered that the enzymatic system of the cereal grain has been developed and conditioned and that the product is then malt.

In the fourth step the germinated green malt is kilned to reduce its moisture content and to stop further growth. The dried malt is then cleaned and stored. The cleaning usually removes the rootlets, loose hulls and broken kernels.

Malt differs in a number of significant respects from the cereal grain used. With regard to barley malt, it contains less moisture and is more suitable for storing and grinding than barley grain. Also, the endosperm of the malt is mellow compared with the hard endosperm of the original barley kernel and the enzymatic values of the malt are greatly increased compared to those of the original barley grain. The barley malt has flavor and aroma and is readily extracted and converted. Similar conversions take place in the malting of other cereal grains or legumes.

Losses in the malting operation take place in every step. Thus, there is a loss during steeping of about 1%, a loss of about 5 to 8% during germination through formation of carbon dioxide and water, plus about a 3 to 5% loss in weight in rootlets and loose husks. There is also a loss in moisture due to drying. The average malting yield with normal malting is in the range of 90–92% (dry weight of malt to dry weight of barley). Any methods or procedures which reduce or eliminate any of these losses during malting, without lowering the efficiency or being more costly than the gain achieved, is clearly desired in the malting process. Of course, it is desired that any such improvements which reduce losses result in the production of malt having properties and characteristics suitable for the intended uses.

Gibberellic acid has been used in the malting process to enhance growth but its use is limited because the recoveries of malt obtained are reduced. The increased growth induced by gibberellic acid generally increases losses by respiration and rootlet growth and these losses are not entirely overcome by the reduction in malting time or other gains.

It has now been found, according to the subject invention, that cereal grains can be malted and good recoveries of malt with excellent industrial use properites obtained by subjecting the grain to the action of a small amount of an alcohol including hydroxylated organic compounds, in the period from harvesting the grain to a time after steeping and before significant germination of the grain is substantially completed.

By "harvesting" as used herein means that time right after the grain kernels are separated from the straw and gathered together for appropriate handling.

The alcohols including hydroxylated organic compounds, suitable and effective for practicing the malting process of this invention are not seemingly limited to any narrow type or class of alcohols. Alcohols of the most common, available types are effective and satisfactory, as well as the more complex alcohols containing elements besides carbon, oxygen and hydrogen, and having various types of ring systems. In addition, both hydrophilic and hydrophobic alcohols can be used.

More specifically, some of the alcohols which can be used in this invention can be represented by the formula:

$$R—OH$$

in which R is:

(a) An alkyl, including both lower and higher alkyls, such as methyl, ethyl, propyl, butyl, amyl, n-octyl and dodecyl;

(b) An alkenyl, including both lower and higher alkenyls, such as allyl, crotyl and 4-octenyl;

(c) An alkynyl, including both lower and higher alkynyls, such as propargyl;

(d) An aryl group such as phenyl and naphthyl;

(e) An aralkyl, particularly phenyl-alkyl groups such as benzyl, phenylethyl, phenylpropyl and phenyloctyl;

(f) An aralkenyl, particularly phenyl-lower alkenyl groups such as cinnamyl and 2-phenyl-4-penten-2-;

(g) An aralkynyl such as phenylpropargyl;

(h) Cycloalkyls such as cyclopropyl, cyclopentyl, cyclohexyl; and (i) Cycloalkyl-alkyls such as beta-cyclopentylethyl.

Such groups are to be considered only representative, since many alcohols containing additional groups are suitable. In addition, one or more of a wide variety of substituents can be present in the alcohols including halo, nitro, amino, alkoxy and ether groups.

In addition to monohydric alcohols, it has been found that polyols including alkylene glycols and polyalkylene glycols also function suitably in the process. The polyols can also contain other groups such as halo, nitro, amino and ether groups.

Specific alcohols which can be used are methyl alcohol, ethyl alcohol, propyl alcohol, isopropyl alcohol, n-butyl alcohol, sec-butyl alcohol, amyl alcohol, isoamyl alcohol, nonyl alcohol, undecyl alcohol, 2-amino ethanol, 2-bromo ethanol, allyl alcohol, propargyl alcohol, phenol, benzyl alcohol, phenylethyl alcohol, 3-phenyl-1-propyl alcohol, 1-(p-tertiary butyl phenoxy) propanol-2, 1,2-cyclopentane diol, styrene glycol, p-tertiary butyl phenol, 4-tertiary butyl catechol, o-allyl phenol, tetrachlorohydroquinone, N-(betahydroxyethyl)-ethylenediamine, 2,4-dibromophenol, 3,4,5-trichlorophenol, 3,4,6-trichloro-2-nitrophenol, 2-phenoxyethyl alcohol, glycerol, ethyleneglycol, propylene glycol, mono methyl ether of ethylene glycol, furfuryl alcohol and butyl Cellosolve. Additional species are shown in the examples.

The action of the alcohols appears to selectively retard or inhibit the growth of the embryo or germ in the kernel while permitting the necessary changes to take place in the aleurone layers and endosperm to produce malt.

The alcohol can be added to the grain at any time after harvesting and before significant germination of the grain is substantially completed.

Addition of the alcohol to the dry grain before steeping usually requires an extended period before the alcohol achieves its effect although the time required can vary from alcohol to alcohol and with the concentration of the alcohol. In general, anywhere from 2 weeks to 4 months storage after application of the alcohol before putting the grain in process is desired to obtain appreciable increases in malting yield. The extended time needed is considered due to the low moisture content of the dry grain.

The alcohol can also be added in the steeping step but because of the diluting effect of the water rather large amounts of alcohol are required.

The presently considered most desirable period in which to add the alcohol is after steep-out and before significant germination of the grain has taken place. The alcohol also can be added during the germination phase itself but, of course, with decreased effectiveness because of the growth and respiration which has already taken place.

The activity of the alcohols in inhibiting germ growth varies considerably and therefore the effective concentration range for each alcohol is determined by titration methods using different levels of alcohol. Within the effective concentration range of each alcohol the higher amounts of alcohol give higher yields of malt. However, the amount of alcohol used is to be correlated with the necessary alpha-amylase and modification required in the malt. Too large amounts of alcohol can lower the alpha-amylase and modification values unduly and render the product unusable as malt for many purposes. Insufficient alcohol will lead to little, or insignificant, increases in malt yield and thus the benefits of the invention would not be realized. Some of the alcohols are more active than others. Allyl alcohol, for example, is very effective at 0.1 ml. per 1,000 g. of dry barley when added after steep-out. Similarly, n-butyl alcohol gives good results at less than 4 ml., while ethyl alcohol requires about 10 ml., per 1,000 g. of barley. When added during steeping about 5 to 30 times more alcohol is needed than when added after steep-out to obtain an equivalent effect although the amount can vary considerably outside of this range with certain alcohols.

The following table gives the approximate effective concentration of a group of alcohols when each is applied to barley after steep-out and then couched at 60–62° C. for 24 hours in a closed container and then germinated in a conventional manner.

| Alcohol: | Ml. alcohol per 1,000 g. barley |
|---|---|
| Methyl alcohol | 30 |
| Ethyl alcohol | <15 |
| Propyl alcohol | <4 |
| Isopropyl alcohol | <30 |
| n-Butyl alcohol | <4 |
| Sec-butyl alcohol | <7.5 |
| Amyl alcohol | <2 |
| Tert. pentyl alcohol | <5 |
| Isopentyl alcohol | <3 |
| Nonyl alcohol | <4 |
| Undecyl alcohol | <4 |
| Phenol | *<1.5 |
| Phenylethyl alcohol | <1.5 |
| 3-phenyl-1-propyl alcohol | <1 |
| Benzyl alcohol | <1.5 |
| 2-phenoxyethyl alcohol | <4 |
| Allyl alcohol | <0.2 |
| Propylene glycol | <10 |
| 2-methoxyethyl alcohol | <4 |
| Furfuryl alcohol | 2 |
| 2-propyn-1-ol(propargyl alcohol) | <0.25 |
| Ortho-allyl phenol | <1.5 |
| p-Tert. butyl phenol | *<2 |
| 4-tert. butyl catechol | *<1 |
| Styrene glycol | *<6 |
| 1,2-cyclopentane diol | *5 |
| 1-(p-tert.-butylphenoxy)-propanol-2 | *<1 |
| 2-aminoethanol | 3 |
| N-(beta-hydroxyethyl)ethylene diamine | <5 |
| 2-bromoethanol | <0.2 |
| 2,4-dibromophenol | *<1 |
| 3,4,5-trichlorophenol | *<1 |
| 3,4,6-trichloro-2-nitrophenol | *<0.25 |
| Tetrachlorohydroquinone | *<2 |

* These compounds are solids at room temperature and the concentrations given are in terms of g./1000 g. barley.

Because of the wide variation in effectiveness of the alcohols it is only possible to indicate broadly the concentration range in which most suitable alcohols will fall. Thus, the most useful alcohols will require about 0.02 to 200 parts by weight per 1,000 parts by weight of dry grain (barley) with the higher amounts being needed when all or part of the alcohol is added during steeping.

The effectiveness of the treatment can be enhanced by couching the grain under nonaerating conditions after the addition of the alcohol. This can be done when the alcohol is added after steep-out, or during the steeping step by partially steeping the grain, draining it, adding the alcohol and couching the grain before completing the steeping.

The alcohol can be added under conditions of temperature normally employed in storing the grain and in the subsequent malting process.

It has also been found, according to the subject invention, that by using an alcohol, as described herein, in conjunction with a small amount of gibberellic acid in the period from harvesting the grain to a time after steeping but before significant germination of the grain begins that cereal grains can be malted with equally high recoveries but with substantially improved enzyme activity and modification than without the gibberellic acid. In addition, the malt has excellent use properties.

Although an alcohol alone suppresses growth of the embryo or germ and gives high yields of malt, sometimes there is a reduction of alpha-amylase and modification values below those considered desirable. However, when a small amount of gibberellic acid is used in conjunction with an alcohol, malt is obtained in very high, almost theoretical (except for unavoidable losses from steeping and handling) yields with good alpha-amylase and modification values.

The gibberellic acid can be applied to the grain and stored before being malted. Although the gibberellic acid can be applied during steeping, excessive amounts of this valuable and expensive substance would be lost in the steep water. The optimum time to apply the gibberellic acid is after steeping is completed and the grain has been drained but before significant germination has begun (usually within 24 hours after steep-out).

The amount of gibberellic acid required in the process of this invention is very small and generally need not exceed 3 parts per million based upon the dry weight (0% moisture) of the cereal grain being malted. As little as about 0.05 part per million are useful but, in general, it is recommended that about 0.10 to 1.5 parts per million of gibberellic acid be used per dry weight of cereal grain being malted. The gibberellic acid can be applied conveniently by means of a solution sprayed on the grain with suitable mixing to achieve a substantially uniform application of the gibberellic acid to the grain.

The term "gibberellic acid" as used herein and in the claims is intended to include the free acid as well as chemical equivalents and derivatives thereof provided they function satisfactorily in the process, such as the alkali metal and alkaline earth metal salts thereof, and particularly the sodium and potassium salts, alkyl esters thereof and particularly the methyl, ethyl, propyl and butyl esters, as well as acyloxy derivatives thereof, such as acetyl gibberellic acid.

After the alcohol and gibberellic acid are applied, the cereal grain can then be subjected to routine germinating conditions for a period sufficiently long to achieve modification of the grain into an acceptable malt characterized by a suitable enzyme capability, as well as other properties generally normal to malt, such as color, aroma, and the like. This germination or modification period usually requires a period of about three to five days. However, it is advisable that the germination time be held to a minimum so that modification is achieved before the stunned germ becomes revitalized and undesirable growth appears. Minimizing the germination time also avoids any adverse effect which growth of microorganisms might otherwise induce although a bacteriostatic agent, such as sodium bisulfite or sodium metasulfite, can be used on the germinating grain to control microflora. The germination conditions of moisture, temperature and aeration are those generally employed in the germination step in conventional malting processes although in the process of this invention the germination period in general is usually shorter, and often by as much as one day.

The germination results in a malt free, or substantially free, of rootlets, and which has been produced with a minimum of respiration, including a minimum production of carbon dioxide. As a result, less cooling is required during germination than in other malting processes. This in itself results in an economy, as does, of course, the production of malt without the weight loss due to respiration and rootlet formation.

Following the germination period, the green malt is kilned with the generally acceptable conditions of time and temperature so as to produce a malt having a moisture content of about 4 to 6%. The malt so obtained has good modification and good alpha-amylase values and is suitable for use in the brewing and distilling industries as well as in foodstuffs. Beer made from such malt has excellent aroma and color and is characterized by a pleasing palate.

While temperatures below about 70° F. are used in commercial malting processes, it has been found that by heating the grain being malted to a temperature from about 80° F. to about 160° F. while also using gibberellic acid and an alcohol that the yields of malt can be maintained high while using less of the alcohol than would otherwise be the case.

The following examples are presented to illustrate the invention. In these examples alpha-amylase is reported in units determined by Methods of Analysis of the American Society of Brewing Chemists, 6th ed., page 169 (1958), American Society of Brewing Chemists, Madison 5, Wisconsin.

The Modification Index values reported in the examples is a measure of the conversion of the barley, or other grain, to malt. The higher the value, the greater is the conversion into malt. Malts have modification index values up to 50 (and higher) while barley has a value less than 2. The modification index provides similar information as coarse-fine grind extract difference determinations and the relationship between them may be approximated as follows.

| Modification index: | Coarse-fine extract difference |
|---|---|
| 65, very well modified | 1.0 |
| 50 | 1.8 |
| 40 | 2.5 |
| 35 | 3.0 |
| 30 | 3.7 |
| 20 | 5.5 |
| 15, poorly modified | 7.5 |

$$\text{The modification index} = 100 \times \frac{1}{\text{TCA viscosity}}$$

TCA viscosity is determined as follows:

A 25 gm. sample of malt is finely ground (Miag Cone Mill, setting 95). A flask is heated to approximately 68° C., 25 mls. of 40% trichloroacetic acid is added and then 200 mls. of hot tap water. The mixture is cooled to 68° C., the 25 gm. of malt added and the mixture blended 2 minutes and filtered.

A viscosimeter is cooled to 20° C. and a 10 ml. sample of the malt dispersion is added. After cooling to 20° C. the running time is recorded. This is then repeated.

The water time of the viscosimeter is measured by adding 10 ml. of distilled water to a clean, drained viscosimeter and the running time measured at 20° C.

The viscosity is then calculated as follows:

$$\text{TCA viscosity} = \frac{\text{Running time of malt solution}}{\text{Running time of water}}$$

*Example 1.—Ethyl alcohol with and without gibberellic acid*

Various 500 g. lots of barley (dry) were steeped to 41% moisture and then drained. The steep-out barley lots were then treated with different amounts of alcohol, with and without the use of gibberellic acid, and a control without either alcohol or gibberellic acid was also run.

The barley lots were then couched in closed containers for 24 hours at 60–62° F., the moisture then raised to 45% and the barley held under malting conditions (60–62° F. and aeration with moist air) for 4 additional days.

The barley lots were then kilned in the normal way by drying at 129° F. to low moisture and finishing at 175° F.

| Ethyl alcohol concentration (ml./1,000 g.) | Gibberellic acid (p.p.m.) | Alpha-amylase (units) | Modification Index | Malting yield [1] (percent) |
|---|---|---|---|---|
| 0 | 0 | 56 | 39 | 92. |
| 0 | 1.0 | 75 | 50 | 90.0 |
| 5 | 0 | 31 | 44 | 92.3 |
| 5 | 1.0 | 57 | 57 | 91.5 |
| 10 | 0 | 26 | 41 | 94.0 |
| 10 | 1.0 | 42 | 80 | 93.0 |
| 15 | 0 | 11 | 34 | 96.0 |
| 15 | 1.0 | 35 | 56 | 95.6 |
| 20 | 0 | 4 | 28 | 97.0 |
| 20 | 1.0 | 29 | 54 | 96.5 |
| 25 | 0 | 2 | 28 | 97.5 |
| 25 | 1.0 | 21 | 40 | 97.0 |

[1] Percent recovery by weight of oven dried malt from oven dried barley (i.e., 0% water in malt and barley).

The ethyl alcohol alone, without gibberellic acid, increases the malting yield such as up to 94% compared to the normal yield of about 92%. The use of ethyl alcohol alone as a treatment in the malting process achieves substantial benefits in economics of malt recovery from barley by the reduction of rootlet growth and respiration. The modification of the barley kernel progressed favorably even with high levels of alcohol. Although the alcohol alone lowers alpha-amylase values the concentration of alcohol can be selected to give acceptable alpha-amylase and increased malting yields.

The use of ethyl alcohol in combination with gibberellic acid gave exceptionally high malting yields combined with excellent modification and alpha-amylase as shown in the table. The combination of alcohol and gibberellic acid gave malting yields approaching absolute (97%), allowing for unavoidable steeping and abrasion losses, resulting from essentially complete stoppage of rootlet growth and respiration coincident with good enzyme production and the action of enzymes within the kernel of barley (modification).

*Example 2.—The effect of gibberellic acid concentration with and without ethyl alcohol*

The procedure of Example 1 was followed. Various levels of gibberellic acid were applied, as shown in the following table, to 500 g. lots of steep-out barley. The ethyl alcohol was also added to the steep-out barley. The couching and germinating were effected at the somewhat cool range of 58–60° F. This experiment was conducted at lower temperatures than were used in most of the other examples. The couching and germination temperature is quite critical, particularly in the production of alpha-amylase.

| Gibberellic acid (p.p.m.) | Ethyl alcohol (ml./1000 g.) | Alpha-amylase (units) | Modification Index | Malting Yield (percent) |
|---|---|---|---|---|
| 0 | 0 | 44 | 34 | 92.2 |
| 0 | 15 | 6 | 28 | 97.5 |
| .125 | 0 | 51 | 43 | 91.4 |
| .125 | 15 | 10 | 38 | 97.1 |
| .25 | 0 | 64 | 42 | 91.0 |
| .25 | 15 | 12 | 40 | 97.0 |
| .50 | 0 | 60 | 51 | 91.0 |
| .50 | 15 | 15 | 35 | 97.5 |
| 1.0 | 0 | 68 | 49 | 89.5 |
| 1.0 | 15 | 17 | 35 | 97.5 |
| 2.0 | 0 | 72 | 51 | 90.0 |
| 2.0 | 15 | 20 | 39 | 97.5 |

Without the use of alcohol, the application of increasing quantities of gibberellic acid progressively decreased malting yield and increased alpha-amylase and modification.

With the use of alcohol, in combination with the gibberellic acid, the malting yield was high and almost uniform throughout, and independent of gibberellic acid concentration. With the first increment of gibberellic acid, modification was quite uniform throughout the whole series. Alpha-amylase showed progressive increase, depending on the gibberellic acid concentration, reaching 20 units with the highest level used.

A unique feature of the invention is illustrated by the obtainment of very high malt yields and good kernel modification by the use of alcohol with gibberellic acid, and the latter even in minute quantities.

Alpha-amylase can be regulated either by a change in the environmental conditions or by increasing the concentration of gibberellic acid used. Thus, in a separate experiment, using higher process temperatures of 60–62° F., gibberellic acid concentrations between 0.2 p.p.m. and 1.6 p.p.m., and 15 ml. of ethyl alcohol per 1,000 g. of barley, the malt yields varied between 95.8 and 96.2, modification index between 50 and 54, and alpha-amylase between 31 and 45 units.

*Example 3.—Effect of alcohol applied at different stages, and in different malting procedures*

500 g. barley (dry) used in all instances.
Total malting time—couch and germination, 5 days.
Germination temperature 60–62° F., preceding normal kilning.

A. The barley was steeped 3 hours at 55° F. to about 25% moisture, drained, treated with 15 ml. of ethyl alcohol per 1000 g. of barley with 1.0 p.p.m. of gibberellic acid. It was then couched 24 hours at 60° F., then resteeped to 45% moisture, drained, and germinated: 95.5% malt yield, 44 modification index, and 36 units alpha-amylase.

B. The barley was steeped 24 hours to 40% moisture, drained and treated with 15 ml. of ethyl alcohol per 1000 g. of barley and 1.0 p.p.m. of gibberellic acid, couched 24 hours at 60° F., and then germinated: 96.8% malt yield, 48 modification index, and 38 alpha-amylase units.

C. The barley was steeped to 40% moisture, drained, treated with 15 ml. of ethyl alcohol per 1000 g. of barley and 1.0 p.p.m. of gibberellic acid for 18 hours at 86° F., cooled to 60° F., couched 6 hours then germinated: 96.5% malt yield, 43 modification index, and 18 alpha-amylase units.

D. The barley was steeped to 40% moisture, drained, treated with 10 ml. of ethyl alcohol per 1000 g. barley and 1.0 p.p.m. gibberellic acid, couched 24 hours at 60° F., germinated for 24 hours, treated with an additional 5 ml. of ethyl alcohol per 1000 g. of barley and then continued under germination conditions: 95.5% malt yield, 55 modification index, and 29 alpha-amylase units.

E. The procedure was as in B above except that sodium metabisulfite was used in the process, either in steeping or during the growth phase of malting, or both. Grain with growth and respiration repressed serves as a good medium for microfloral growth with occasional off odors. The use of bisulfite brightens the malt and gives a clean odor.

*Example 4.—Use of ethyl alcohol in steeping with and without gibberellic acid*

500 g. barley (dry).

Two steeping procedures were used:

A. Steeped 3 hours at 55° F., drained and continued steeping for 21 hours at 55° F.

B. Steeped 21 hours at 55° F., drained, and continued steeping for 3 hours at 55° F.

Ethyl alcohol was added either in the first or second short steep, or the first or second long steep, as indicated.

At steep-out some samples were treated, as indicated, with 0.5 p.p.m. of gibberellic acid, water added to bring the material to 45% moisture, and the treated barleys subjected to malting conditions at 60–62° F. for 5 days before kilning.

| Treatment time [1] | | Ethyl alcohol (ml./1,000 g.) | Gibberellic acid (p.p.m.) | Alpha-amylase (units) | Mod. Index | Malting yield (percent) |
|---|---|---|---|---|---|---|
| First steep (hrs.) | Second steep (hrs.) | | | | | |
| 3 | | 200 | 0.5 | 56 | 57 | 92.8 |
| | 3 | 200 | 0.5 | 34 | 53 | 96.3 |
| 21 | | 200 | 0.5 | 35 | 53 | 95.4 |
| | 21 | 200 | 0.5 | 25 | 47 | 97.3 |
| 3 | | 200 | 0 | 40 | 42 | 93.8 |
| | 3 | 200 | 0 | 9 | 32 | 96.5 |
| 21 | | 200 | 0 | 17 | 38 | 95.8 |
| | 21 | 200 | 0 | 3 | 27 | 97.3 |
| 3 | | 100 | 0 | 55 | 44 | 92.3 |
| | 3 | 100 | 0 | 22 | 45 | 94.5 |
| 21 | | 100 | 0 | 40 | 42 | 93.5 |
| | 21 | 100 | 0 | 13 | 36 | 96.2 |
| Control malt | | 0 | 0 | 63 | 36 | 91.0 |
| Control malt | | 0 | 0.5 | 75 | 50 | 89.8 |

[1] Ethyl alcohol applied in steep for which time of treatmenti s given in columns.

Control malts, with and without 0.5 p.p.m. of gibberellic acid were also run. These received a 3-hour first steep followed by a 21-hour second steep, with gibberellic acid treatment, if used, at steep-out.

The data shows ethyl alcohol in steeping results in increased malting yields with adequate alpha-amylase and good modification. However, adding the alcohol in steeping requires larger amounts of alcohol, because of the dilution by the steep water, than when the alcohol is added to steep-out barley.

The effect of the alcohol is greater the higher the moisture content of the steeping barley and the longer the contact time.

*Example 5.—Use of ethyl alcohol on barley before steeping or processing*

500 g. barley (dry).

The barley was treated with ethyl alcohol as indicated, placed in a sealed container and held at approximately 70° F.

At the end of a 4 months holding period, the treated barley was steeper at 55° F. to a moisture content of 40–41%, drained, treated with gibberellic acid as indicated and held under malting conditions for 5 days at 60–62° F. before kilning.

| Ethyl alcohol in barley storage (ml./1,000 g. barley) | Gibberellic acid at steep-out (p.p.m.) | Alpha-amylase (units) | Mod. Index | Malting yield (percent) |
|---|---|---|---|---|
| 30 | 0 | 23 | 18 | 93.6 |
| 30 | .5 | 32 | 47 | 93.2 |
| 0 | 0 | 56 | 33 | 90.8 |
| 0 | .5 | 69 | 46 | 89.3 |

*Example 6.—Use of heat to increase the efficiency of ethyl alcohol*

500 g. barley (dry).

The barley was steeped to 40–41% moisture, drained, adjusted to the indicated temperature, treated with 0.5 p.p.m. of gibberellic acid and the indicated level of ethyl alcohol and held at temperature for 6 hours before being cooled, where necessary, and subjected to germinating conditions at 60–62° F. for 5 days before being kilned.

| 6-hour holding temp. (° F.) | Ethyl alcohol (ml./1,000 g. barley) | Alpha-amylase (units) | Modification Index | Malting yield (percent) |
|---|---|---|---|---|
| 62 | 0 | 50 | 39 | 91.5 |
| 62 | 5 | 40 | 47 | 93.5 |
| 62 | 10 | 34 | 47 | 95.0 |
| 62 | 14 | 30 | 43 | 96.3 |
| 90 | 0 | 50 | 45 | 90.8 |
| 90 | 5 | 49 | 55 | 93.5 |
| 90 | 10 | 38 | 59 | 96.0 |
| 90 | 14 | 32 | 57 | 96.4 |
| 100 | 0 | 51 | 58 | 93.9 |
| 100 | 5 | 38 | 58 | 96.4 |
| 100 | 10 | 29 | 56 | 97.1 |
| 100 | 14 | 21 | 51 | 97.7 |

The data show that increasing the temperature at which the barley is treated with alcohol permits the production of almost identical malt and malt yield with substantially lower alcohol concentrations. For example, 14 ml. of alcohol was needed to achieve 96.3 to 96.4% malt recovery with holding temperatures of 60° or 90° F., whereas this same recovery was achieved by 5 ml. of alcohol at a holding temperature of 100° F. Further, the use of a 100° F. holding temperature permitted a very high recovery of 97.1% with 10 ml. of alcohol simultaneously with good levels of alpha-amylase and modification.

*Example 7.—Relation of treatment time to alcohol concentration*

500 g. barley (dry).

The barley was steeped to 40–41% moisture, drained, and the steep-out barley treated with 1.0 p.p.m. of gibberellic acid and alcohol concentrations as indicated in the table below. The barley was held in a closed container in couch at 58–60° F. for the indicated time at 60° F. before being placed under malting conditions —58–60° F., and constantly aerated with humidified air.

The total malting time, couch and growth phase, was 5 days.

Note: Cooler than normal couching and malting temperatures resulted in reduced amylase production and modification.

| Ethyl alcohol (ml./1,000 g. barley) | Couch time (hours) | Alpha-amylase (units) | Modification Index | Malting yield (percent) |
|---|---|---|---|---|
| 5.0 | 2.5 | 49 | 49 | 93.5 |
| 5.0 | 24 | 38 | 38 | 95.0 |
| 5.0 | 48 | 21 | 26 | 95.3 |
| 10 | 2.5 | 34 | 42 | 95.3 |
| 10 | 24 | 20 | 30 | 96.5 |
| 10 | 48 | 7 | 21 | 96.2 |
| 15 | 2.5 | 21 | 33 | 96.2 |
| 15 | 24 | 14 | 27 | 97.0 |
| 15 | 48 | 4 | 13 | 97.3 |

For any given alcohol concentration the effectiveness is increased proportional to the time in couch.

*Example 8.—Use of the alcohol-gibberellic acid combination with malting cereals other than barley*

500 g. grain (dry).
Steeped to 40% moisture.

The steep-out grain was treated with gibberellic acid and alcohol as indicated, and couched 24 hours at 60° F.

The grain was then subjected to malting conditions for an additional 4 days at 60–62° F. before kilning.

| Cereal | Ethyl alcohol (ml./1,000 g. grain) | Gibberellic acid (p.p.m.) | Alpha-amylase (units) | Modification Index | Malting yield (percent) |
|---|---|---|---|---|---|
| Wheat | 16 | .5 | 48 | 45 | 97.2 |
| Wheat | 0 | 0 | 44 | 48 | 93.2 |
| Oats | 10 | .5 | 24 | 71 | 93.1 |
| Oats | 0 | 0 | 39 | 71 | 91.3 |
| Rye | 20 | .5 | 47 | 32 | 94.5 |
| Rye | 0 | 0 | 53 | 29 | 89.7 |

These data for wheat, oats, and rye show alcohol and gibberellic acid can be used with other cereals than barley, resulting in improved malting yield coincident with good modification and alpha-amylase activity.

*Example 9.—The effect of different alcohols in combination with gibberellic acid*

The procedure of Example 1 was followed to evaluate the effect of different alcohols used in combination with 1.0 p.p.m. of gibberellic acid in malting. The alcohol and gibberellic acid were added to the steep-out barley at 40% moisture. In all other respects the process was as in Example 1. The results obtained are given in the following table.

| Alcohol | Concentration (ml./1,000 g.) | Alpha-amylase (units) | Mod. Index | Malting yield (percent) |
|---|---|---|---|---|
| Methyl alcohol | 30 | 30 | 51 | 92.8 |
| Ethyl alcohol | 4 | 60 | 43 | 92.0 |
| Do | 30 | 22 | 39 | 98.5 |
| Iso-propyl alcohol | 30 | 32 | 50 | 95.5 |
| n-Propyl alcohol | 4 | 13 | 20 | 96.2 |
| n-Butyl alcohol | 4 | 20 | 23 | 96.3 |
| n-Amyl alcohol | 4 | <1 | <5 | 97.7 |
| n-Amyl alcohol | 1 | 41 | 32 | 94.5 |
| n-Nonyl alcohol | 4 | 13 | 16 | 96.2 |
| n-Undecyl alcohol | 4 | 49 | 48 | 93.7 |
| Phenyl ethyl alcohol | 4 | <1 | <5 | 97.5 |
| Do | 1.5 | 31 | 41 | 93.3 |
| 3 phenyl, 1 propyl alcohol | 4 | <1 | <5 | 97.0 |
| Do | 1 | 39 | 35 | 94.2 |
| 2-phenoxyethyl alcohol | 4 | 2 | 6 | 97.2 |
| Allyl alcohol | 0.1 | 23 | 40 | 95.5 |
| Phenol | [1] 1.5 | 30 | 32 | 95.5 |
| Gylcerol | 10 | 56 | 32 | 93.8 |
| Propylene glycol | 10 | 36 | 36 | 94.9 |
| Mono methyl ether of ethylene glycol | 4 | 21 | 38 | 94.5 |
| Furfuryl alcohol | 2 | 25 | 28 | 94.0 |

[1] Phenol is expressed as "g. per 1,000 g. barley."

The malting yields for the control malts were 92.3% without gibberellic acid and 91.5% with gibberellic acid.

The data shows that a wide variety of alcohols can be used to increase the malting yield by proper selection of the optimum concentrations. For each alcohol, a concentration can be selected which permits alpha-amylase production and malt modification to occur simultaneously with the increased malting yield. The optimum concentration, and usable range, is easily arrived at by conventional techniques of titrating activity at various alcohol concentration levels.

*Example 10*

The procedure of Example 1 was followed to evaluate the effect of group of alcohols in addition to those illustrated in Example 9. With this group, the alcohol treatment was combined with 0.5 p.p.m. of gibberellic acid.

| Alcohol | Concentration (ml. or g./1,000 g. barley) | Alpha-amylase (units) | Modification index | Malting yield (percent) |
|---|---|---|---|---|
| Secondary butyl alcohol | 7.5 | 12 | 26 | 96.5 |
| Benzyl alcohol | 1.5 | 25 | 35 | 94.5 |
| Ortho allyl phenol | 1.5 | 12 | 29 | 95.0 |
| 2-propyn-l-ol (propargyl alcohol) | 0.25 | 31 | 29 | 95.0 |
| Tert. pentyl alcohol | 5.0 | 19 | 26 | 96.3 |
| Iso pentyl alcohol | 3.0 | 19 | 18 | 95.5 |
| Styrene glycol | [1] 6.0 | 16 | 29 | 95.2 |
| Cyclo pentane diol | [1] 5.0 | 37 | 48 | 93.0 |
| p-tert. butyl phenol | [1] 2.0 | 17 | 29 | 96.0 |
| 4-tert. butyl catechol | [1] 1.0 | 31 | 49 | 94.6 |
| 1-(p-tert. butylphenoxy)propanol-2 | [1] 1.0 | 21 | 46 | 94.8 |
| 2-amino ethanol | 3.0 | 42 | 36 | 94.6 |
| 2-amino ethanol | 5.0 | 19 | 21 | 98.0 |
| N-(beta-hydroxyethyl) ethylene diamine | 5.0 | 29 | 27 | 97.2 |
| 2-bromo ethanol | 0.2 | 28 | 44 | 93.5 |
| 2,4-dibromophenol | [1] 1.0 | 12 | 21 | 96.3 |
| 3,4,5-trichlorophenol | [1] 1.0 | 18 | 13 | 95.3 |
| 3,4,6-trichloro-2-nitro phenol | [1] 0.25 | 15 | 30 | 95.2 |
| Tetrachlorohydroquinone | [1] 2.0 | 12 | 20 | 94.5 |

[1] G./1,000 gms. barley.

The malt recoveries for the control malts in Example 10 varied in the 91 to 92% recovery range without gibberellic acid and in the 90 to 91% range with gibberillic acid but no alcohol.

All of the compounds listed in Example 10 increased the malt recovery over that found with no treatment. While there was variability both in the effectiveness of individual compounds, as well as in the effective concentrations of individual compounds, they all permitted modification and enzyme production to be achieved when they were used in conjunction with a low level (0.5 p.p.m.) of gibberellic acid. Like the simpler alcohols such as ethanol, these more complex hydroxyl compounds are capable of differentially inhibiting the rootlet formation and respiration functions without destroying the enzyme production and modification potentials than can be stimulated by gibberellic acid.

*Example 11.—Use of the alcohol-gibberellic acid combinations with the addition of alcohol delayed until part way through the germination process*

500 g. barley (dry).

Steeped to 40–42% moisture, drained and the gibberellic acid added to the steeped-out barley as indicated, and moisture adjusted to 44–45%.

Held under malting conditions for 24 hours at 60–62° F. to initiate growth. Then treated with indicated level of ethyl alcohol and couched for 24 hours at 60–62° F. before germinating conditions were resumed for a total of 5 days after steep-out before being kilned.

| Ethyl alcohol (ml./1,000 g. barley) | Gibberellic acid (p.p.m.) | Alpha-amylase (units) | Modification index | Malting yield (percent) |
|---|---|---|---|---|
| 10 | 0 | 18 | 33 | 95.6 |
| 15 | 0 | 8 | 33 | 97.0 |
| 10 | .2 | 30 | 43 | 95.0 |
| 15 | .2 | 18 | 43 | 97.1 |
| 0 | 0 | 42 | 34 | 91.6 |

The data of this example show that it is not necessary to confine the addition of alcohol to the steep-out barley before any growth has taken place. It can be added later in the process, for example, after 24 hours of normal germination. However, this is not the procedure of choice since the improvement in malting yield over normal control malt is not as great as when the treatment is made before appreciable growth and respiration has taken place.

What is claimed is:

1. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of an alcohol per million parts of dry cereal grain to the grain in the period from harvesting the grain to a time after steep-out and before germination of the grain is substantially completed, the amount of said alcohol used being sufficient to significantly increase the malting yield and give a malt with alpha-amylase and modification values of industrial utility and with the alcoholic function of the alcohol being due solely to hydroxyl groups present.

2. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of an alcohol, and about 0.05 to 3 parts by weight of gibberellic acid, per million parts of dry cereal grain to the grain in the period from harvesting the grain to a time after steep-out and before germination of the grain is substantially completed, the amount of said alcohol used being sufficient to significantly increase the malting yield and give a malt with alpha-amylase and modification values of industrial utility and with the alcoholic function of the alcohol being due solely to hydroxyl groups present.

3. The process of claim 2 in which the grain is barley.

4. The process of claim 2 in which the alcohol is an organic compound having at least one hydroxyl group and which is free of a member of the group consisting of acid groups and carbonyl containing groups.

5. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of an alcohol of the formula R—OH per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility, wherein in said formula R is a member selected from the group consisting of alkyl, alkenyl, alkynyl, aryl, aralkyl, aralkenyl, aralkynyl, cycloalkyl and cycloalkyl-alkyl.

6. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of an alkylene glycol per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility.

7. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of a polyalkylene glycol per million parts of dry cereal grain to the grain in the period after harvesting the grain to a time after steep-out and before germination of the grain is substantially completed, the amount of said alcohol being sufficient to significantly increase the malting yield and give a malt with alpha-amylase and modification values of industrial utility.

8. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of a lower alkanol per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility.

9. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of a lower alkenol per million parts of dry cereal grain to the grain in the period after harvesting the grain to a time after steep-out and before germination of the grain is substantially completed, the amount of said alcohol being sufficient to significantly increase the malting yield and give a malt with alpha-amylase and modification values of industrial utility.

10. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of an alcohol of the formula R—OH, and about 0.05 to 3 parts by weight of gibberellic acid, per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility, wherein in said formula R is a member of the group consisting of alkyl, alkenyl, alkynyl, aryl, aralkyl, aralkenyl, aralkynyl, cycloalkyl and cycloalkyl-alkyl.

11. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of an alkylene glycol, and about 0.05 to 3 parts by weight of gibberellic acid, per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility.

12. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of a polyalkylene glycol, and about 0.05 to 3 parts by weight of gibberellic acid, per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility.

13. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 200,000 parts by weight of a lower alkanol, and about 0.05 to 3 parts by weight of gibberellic acid, per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility.

14. In the process of malting a cereal grain which employs steeping grain until it acquires a moisture content suitable for germination, germinating the steeped grain under suitable conditions of aeration and moisture until green malt is produced and kilning the green malt, the improvemnet which comprises applying about 20 to 200,000 parts by weight of a lower alkenol, and about 0.05 to 3 parts by weight of gibberellic acid, per million parts of dry cereal grain to the grain in the period after harvesting the grain to a time after steep-out and before germination of the grain is substantially completed, the amount of said alcohol used being sufficient to significantly increase the malting yield and give a malt with alpha-amylase and modification values of industrial utility.

References Cited by the Examiner

UNITED STATES PATENTS 3,104,207 9/1963 Brian et al. ---------- 195—70

FOREIGN PATENTS 221,001 4/1959 Australia.
633,162 12/1961 Canada.
781,599 8/1957 Great Britain.

A. LOUIS MONACELL, *Primary Examiner.*

D. M. STEPHENS, *Assistant Examiner.*